(12) United States Patent
Merrill et al.

(10) Patent No.: US 8,137,611 B2
(45) Date of Patent: Mar. 20, 2012

(54) PROCESSING METHOD FOR SOLID CORE CERAMIC MATRIX COMPOSITE AIRFOIL

(75) Inventors: Gary B. Merrill, Orlando, FL (US); Christian X. Campbell, Orlando, FL (US); Thomas Barrett Jackson, Portland, OR (US)

(73) Assignee: Siemens Energy, Inc., Orlando, FL (US)

( * ) Notice: Subject to any disclaimer, the term of this patent is extended or adjusted under 35 U.S.C. 154(b) by 1354 days.

(21) Appl. No.: 11/082,415

(22) Filed: Mar. 17, 2005

(65) Prior Publication Data

US 2010/0032875 A1 Feb. 11, 2010

(51) Int. Cl.
*B28B 1/16* (2006.01)
*B28B 1/44* (2006.01)
*B28B 1/48* (2006.01)
*B64C 11/24* (2006.01)
*B64C 11/20* (2006.01)

(52) U.S. Cl. ..... 264/642; 264/632; 264/610; 416/229 R; 416/224; 416/227; 416/232; 416/241 B; 416/226

(58) Field of Classification Search .................. 416/232, 416/233, 241 B, 241 R, 229 R, 334, 337, 416/226
See application file for complete search history.

(56) References Cited

U.S. PATENT DOCUMENTS

| | | | | | |
|---|---|---|---|---|---|
| 2,648,520 | A | * | 8/1953 | Schmitt | 416/92 |
| 2,952,320 | A | * | 9/1960 | Bensen | 416/226 |
| 3,301,526 | A | * | 1/1967 | Chamberlain | 415/115 |
| 3,370,829 | A | * | 2/1968 | Banthin et al. | 415/115 |
| 3,540,810 | A | * | 11/1970 | Kercher | 416/90 R |
| 4,010,531 | A | * | 3/1977 | Andersen et al. | 29/889.721 |
| 4,148,350 | A | | 4/1979 | Rossmann | |
| 4,247,259 | A | * | 1/1981 | Saboe et al. | 416/241 B |
| 4,283,835 | A | * | 8/1981 | Obrochta et al. | 29/527.6 |
| 4,311,433 | A | * | 1/1982 | Bratton et al. | 416/97 A |
| 4,326,833 | A | * | 4/1982 | Zelahy et al. | 416/96 R |
| 4,396,349 | A | * | 8/1983 | Hueber | 415/115 |
| 4,697,985 | A | * | 10/1987 | Suzuki | 416/97 R |
| 5,110,652 | A | | 5/1992 | Allaire et al. | |
| 5,306,554 | A | | 4/1994 | Harrison et al. | |
| 5,358,379 | A | * | 10/1994 | Pepperman et al. | 415/191 |
| 5,382,453 | A | * | 1/1995 | Mason | 427/249.2 |
| 5,431,537 | A | * | 7/1995 | Sturm | 416/97 R |
| 5,465,780 | A | * | 11/1995 | Muntner et al. | 164/516 |
| 5,584,652 | A | * | 12/1996 | Shaffer et al. | 415/115 |
| 5,626,462 | A | * | 5/1997 | Jackson et al. | 416/97 R |
| 5,640,767 | A | * | 6/1997 | Jackson et al. | 29/889.721 |
| 5,820,337 | A | * | 10/1998 | Jackson et al. | 415/200 |
| 5,845,398 | A | | 12/1998 | Maumus et al. | |
| 6,153,889 | A | * | 11/2000 | Jones | 250/559.45 |
| 6,190,133 | B1 | * | 2/2001 | Ress et al. | 416/229 A |
| 6,197,424 | B1 | * | 3/2001 | Morrison et al. | 428/402 |
| 6,280,550 | B1 | * | 8/2001 | Steibel et al. | 156/182 |
| 6,325,593 | B1 | * | 12/2001 | Darkins et al. | 415/115 |
| 6,398,501 | B1 | * | 6/2002 | Darkins et al. | 416/226 |
| 6,451,416 | B1 | * | 9/2002 | Holowczak et al. | 428/293.4 |
| 6,511,293 | B2 | * | 1/2003 | Widrig et al. | 416/96 R |
| 6,514,040 | B2 | * | 2/2003 | Lewis et al. | 415/119 |

(Continued)

*Primary Examiner* — Jason L. Lazorcik

(57) ABSTRACT

A method of processing solid core ceramic matrix composite articles. The method improves the physical characteristics of the article by forming the airfoil using a co-processing method wherein a refractory ceramic is cast against a preformed ceramic matrix composite (CMC) shell. In one aspect, the shell is continuous to help prevent delaminations. In another aspect, the shell is open. In one embodiment, the article includes a split line. The split line helps the article to be less susceptible to damage caused from internal strain.

9 Claims, 2 Drawing Sheets

U.S. PATENT DOCUMENTS

| | | | |
|---|---|---|---|
| 6,514,046 B1 * | 2/2003 | Morrison et al. | 416/229 A |
| 6,578,623 B2 | 6/2003 | Keller et al. | |
| 6,637,500 B2 | 10/2003 | Shah et al. | |
| 6,660,115 B2 | 12/2003 | Butler et al. | |
| 6,696,144 B2 | 2/2004 | Holowczak et al. | |
| 6,709,230 B2 * | 3/2004 | Morrison et al. | 415/115 |
| 6,709,771 B2 * | 3/2004 | Allister | 428/680 |
| 6,739,381 B2 | 5/2004 | Esser et al. | |
| 6,740,286 B2 | 5/2004 | Sutaria et al. | |
| 6,746,755 B2 * | 6/2004 | Morrison et al. | 428/166 |
| 7,066,717 B2 * | 6/2006 | Morrison et al. | 416/230 |
| 7,067,447 B2 * | 6/2006 | Campbell | 501/152 |
| 7,093,359 B2 * | 8/2006 | Morrison et al. | 29/889.71 |
| 7,216,694 B2 * | 5/2007 | Otero et al. | 164/516 |
| 7,255,535 B2 * | 8/2007 | Albrecht et al. | 416/97 R |
| 7,258,530 B2 * | 8/2007 | Morrison et al. | 416/232 |
| 7,275,585 B1 * | 10/2007 | Guerche et al. | 164/516 |
| 7,278,830 B2 * | 10/2007 | Vetters | 416/229 R |
| 7,316,539 B2 * | 1/2008 | Campbell | 415/115 |
| 7,435,058 B2 * | 10/2008 | Campbell et al. | 416/236 R |
| 7,481,621 B2 * | 1/2009 | Campbell et al. | 416/96 R |
| 7,600,978 B2 * | 10/2009 | Vance et al. | 416/230 |
| 7,670,116 B1 * | 3/2010 | Wilson et al. | 416/226 |
| 7,785,076 B2 * | 8/2010 | Morrison et al. | 416/233 |
| 7,837,438 B2 * | 11/2010 | Campbell | 415/191 |
| 2002/0168505 A1 | 11/2002 | Morrison et al. | |
| 2002/0197465 A1 | 12/2002 | Butner et al. | |
| 2003/0075300 A1 | 4/2003 | Shah et al. | |
| 2003/0223861 A1 | 12/2003 | Morrison et al. | |
| 2004/0020629 A1 | 2/2004 | Shah et al. | |
| 2004/0043889 A1 | 3/2004 | Campbell | |
| 2004/0081760 A1 | 4/2004 | Burns et al. | |
| 2006/0226290 A1 * | 10/2006 | Campbell | 244/123.1 |

* cited by examiner

PROCESSING METHOD FOR SOLID CORE CERAMIC MATRIX COMPOSITE AIRFOIL

FIELD OF THE INVENTION

This invention is directed generally to the formation of ceramic matrix composite articles, and more particularly to forming ceramic matrix composite/solid core articles.

BACKGROUND

Solid core ceramic matrix composite articles find their use in turbine components as well as other applications. Combustion turbines are well known in the art as having a compressor section for supplying a flow of compressed combustion air, a combustor section for burning a fuel in the compressed combustion air, and a turbine section for extracting thermal energy from the combustion air and converting that energy into mechanical energy in the form of a shaft rotation. Many parts of the combustor section and turbine section are exposed directly to the hot combustion gasses, for example the combustor, the transition duct between the combustor and the turbine section, and the turbine stationary vanes, rotating blades and surrounding ring segments.

A construction of a ceramic matrix composite (CMC) shell and solid ceramic core has been proposed for use as a turbine vane airfoil for one or more beneficial reasons. In one aspect, these articles include a solid core and the solid core is effective at reducing pressure loads caused by the high pressure cooling air on the inside of the airfoil. In another aspect, these articles may include channels cast within the core, thereby permitting a cooling air flow to be directed through the channels. Another potential benefit of using these articles is to increase robustness of the airfoil construction—a solid core provides bending rigidity and strength, increases impact resistance, and resistance to cyclic excitation (HCF).

While these CMC shell and solid ceramic core articles offer the potential for higher operating temperatures than do metal alloy materials due to the inherent nature of ceramic materials, as well as one or more of the previous benefits, CMC materials generally are not as strong as metal, and therefore the required cross-section for a particular application may be relatively thick.

Temperatures in excess of 1600° C. may be problematic with solid core CMC airfoils, wherein the different ceramic materials that make up the airfoil may have different properties, resulting in internal strain within the core. This mismatch results in stress at the interfaces of the multilayer system and often results in poor bond strength and/or delaminations.

Prior art methods of making airfoils and other ceramic articles fail to address these issues regarding delaminations and/or internal strains that may occur within these airfoils.

Accordingly what is needed is a method of forming ceramic matrix composite shell/solid core articles that alleviates the problems of prior art methods of forming these articles. Also what is needed is a solid core ceramic matrix article that is more resistant to internal strain. Also what is needed is a method that is effective at forming solid core ceramic matrix composite articles in a cost-effective and/or efficient manner.

SUMMARY OF THE INVENTION

This present invention provides a method of forming ceramic matrix composite/solid core articles. The present invention forms a multilayer CMC shell/solid core article using different embodiments to improve the processability of these articles. The articles are formed using a method wherein the CMC shell is used as a mold into which the solid core ceramic is cast. In one embodiment, the article is formed using a split line. In an alternative embodiment, the CMC shell may be formed as a continuous shell. The ceramic matrix composite (CMC)/solid core articles of the present invention are able to deform in relation to internal strain. As such, differential processing shrinkages/growths may be taken up in the direction that is not constrained. In addition, the CMC shell/solid core articles are better able to deform to accommodate the processing dimensional changes by creep, microcracking, and other mechanisms and/or to resist delaminations during use of the articles.

These and other embodiments are described in more detail below.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

Figure 1:
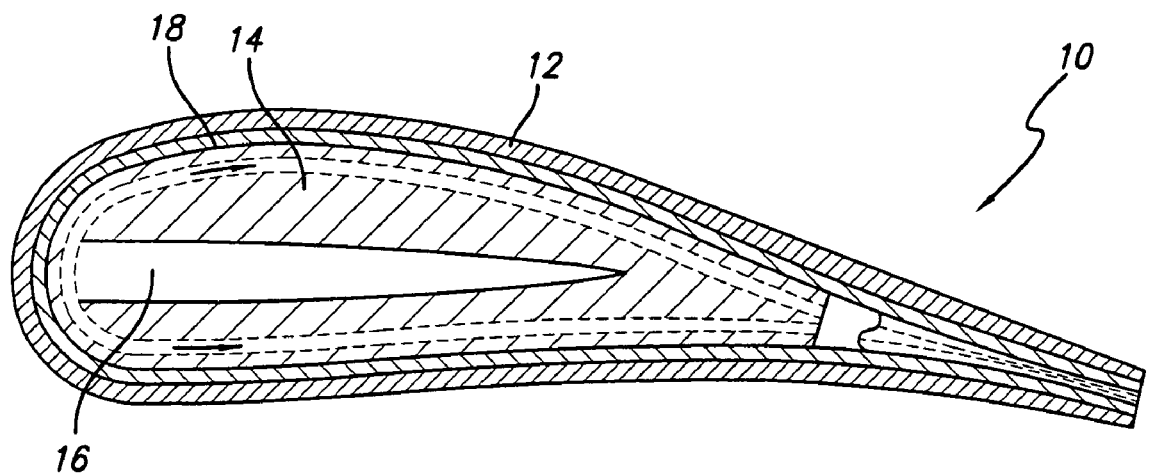
FIG. 1 shows a cross-sectional view of an airfoil having a CMC shell and a solid core having a split line according to one embodiment of the present invention.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides methods of forming articles that have a ceramic matrix composite (CMC) shell and a solid core. The articles of the present invention are formed from a CMC shell and another ceramic as the solid core that is cast into the shell. The CMC shell is used as the mold for the castable refractory ceramic solid core. The CMC shell and core are then fired so that they form a sintered bond between the two materials. This process is known as "co-processing". Internal strain is generated during co-processing due to mismatches in dimensional changes (shrinkage or growth) of the different material systems. Differential dimensional changes arise from drying shrinkage (especially of the cast refractory core), sintering or densification shrinkage, sintering anisotropy of the CMC, and thermal expansion mismatches between material systems. Accordingly, the methods of the present invention and the ceramic articles made by these methods are better able to handle these differential dimensional changes than prior art methods and ceramic articles.

Many prior art articles use a solid core that is fully constrained and, therefore, unable to deform to internal strain. Alternatively, these solid core articles are formed in a manner that results in delaminations at the edges of the article and/or within the article. The present invention provides an article that is manufactured using different methods, but with the resulting CMC shell/solid core article being more resistant to internal strain and/or delaminations at the edges of the article that occur during processing than prior art articles.

The articles of the present invention are formed from a ceramic matrix composites shell and another ceramic as the solid core. The CMC shell is used as the mold for the ceramic solid core. In a first embodiment, a co-processing method is used to form a CMC shell/solid core article capable of resisting delaminations. In an alternative embodiment, a bond layer may be included and added to the interior of the CMC shell to produce a better bonding of the solid core ceramic to the CMC shell. There are many different "bond" layers that could be applied to the bonding surface, i.e., inside of the CMC shell, including, but not limited to, a slurry with high sintering activity, a glass frit, or glass-ceramic type bond layer. The core slurry may then be cast into the bisque-fired CMC shell, with the structure then dried and then sintered at the CMC processing temperature.

In another aspect of the present invention, a castable refractory ceramic was developed that possesses appropriate thermomechanical properties for use as a core material, including high strain tolerance. This refractory ceramic may contain a mixture of ceria and mullite aggregate in an alumina matrix. Other castable refractory ceramics could be envisioned that include, but are not limited to, a mixture of silicon oxides, silicates (amorphous glass or crystalline), aluminum oxide, cordierite, mullite, magnesium oxide, zirconium oxide, zircon, spinel, and garnet.

The articles of the present invention are formed such that they have a solid core. They may be formed using different methods to result in an article that offers one or more advantages versus prior art ceramic core articles. However, in each of these embodiments, the CMC shell is used as a mold for casting the solid ceramic core. The resulting structure is a CMC overwrap with a solid ceramic core.

The CMC shell may be formed to either be a continuous CMC shell, or an open CMC shell. In both instances, the solid core is then cast into the shell, although the choice of a continuous shell or an open shell will depend, in part, on the final selected characteristics of the article.

Accordingly, in a first aspect of the present invention, the methods of forming the articles of the present invention start with the formation of the CMC shell. A rigidized CMC shell may be formed by any standard CMC processing methods, for example, by a process having an initial step of layup of prepregged fabric. Other methods for forming the CMC shell include, but are not limited to:
  the layup of uni-directional laminates,
  filament winding,
  forming a CMC shell by a 3D fiber architecture method (e.g., weaving or braiding) followed by infiltrating the matrix into the preform.

In another embodiment, the CMC shell may be a "continuous" structure, such as a cylinder, box structure, or airfoil (or teardrop) shape. This type of structure may be referred to as a "continuous wrap" structure. In laminated CMCs, delaminations generally form at the free edges because interlaminar shear stresses are generated at the free edge due to thermal gradients or mechanical loads. One advantage of a continuous wrap is that it minimizes free edge effects, which minimizes the likelihood of initiating delaminations in the CMC. Another advantage is that when delaminations form, or if delaminations are already present due to processing defects, the continuous wrap structure minimizes their effect because they are self-contained. Consequently, the continuous wrap structure reduces the requirement for perfect microstructure at all locations. An additional advantage of the continuous wrap structure is that it improves pressure containment capability, which is an important consideration for cooled structures. Yet another advantage is the possibility of incorporating a split line into the article.

Before the core material is cast into a CMC shell, the shell may beneficially be rigidized, so that it is a free standing structure and will not be damaged during the core casting process. The core, depending on the ceramic material used, is typically cast as a water-based ceramic slurry or cement with a wide range of viscosities. Since the CMC shell will get wet, it is beneficial for the CMC matrix to be stabilized such that it does not dissolve or fall apart when exposed to liquid water. At the same time, it would be beneficial for the CMC shell to retain as much sintering activity as possible in order to develop a good core/CMC bond. Therefore, an intermediate firing step, such as a bisque-firing, may performed at a temperature that is just high enough to rigidize the structure and stabilize the matrix against liquid water, but not so high as to cause significant sintering of the CMC matrix. Bisque-firing is, in one embodiment, performed at temperatures greater than about 500° C.

When the core and the CMC are co-processed, it is evident that the thermal growths of the core and the CMC should be closely matched. However, it has been found that for the case of certain continuous wrapped CMC structures, such as the case for "simple" continuous wrapped geometries with cylindrical or oval shaped cross-sections, the microstructure of the CMC and the bondline may be improved, in one embodiment, by using a core composition with lower sintering shrinkage than the CMC. In this configuration, the CMC essentially "shrinks down" onto the core, putting the bond and the CMC in through-thickness compression. Densification of the CMC is enhanced by the pressure force in much the same way as sintering of a ceramic body is enhanced by hot-pressing. However, this phenomenon is not effective at improving the sintered microstructure if the structure contains a significant inverse curvature, where the CMC shrinks away from the core.

Residual stress between the core and the CMC may be generated by differential dimensional changes between the CMC and the core. For example, if the core has a higher coefficient of thermal expansion (CTE) than the CMC, upon cooldown, the core will be in residual tension and the CMC will be in residual compression. It is possible to reduce the magnitude of the residual stress state by using, in one embodiment, an intermediate temperature hold during the cooldown cycle, if the core material creeps at the hold temperature.

If the risk of delaminations is less than the potential of internal strain within the article during use, depending on the intended use of the article, then, in another embodiment, the CMC shell/solid core article may be formed such that the resulting article includes a split line in the otherwise solid core of the article. As the article is likely made from two or more ceramic materials in a multilayer article, the split line helps relieve any internal strain in the direction normal to the split line. As such, the constraint caused by the internal strain is two-dimensional rather than in a full three-dimensional constraint. As used herein, a "split line" is any planar break in the core of a ceramic article that reduces internal strain in one dimension within the article. As internal strain within a ceramic article occurs in three dimensions, a split line eliminates strain in one of these dimensions. In general, split lines may be utilized with continuous CMC shell embodiments.

The split line may be located at any point in the core of the article. In beneficial embodiments, the split line is located at the center of the core. Nevertheless, for other embodiments, it may be beneficial to place the split line in a middle region of the core, but not exactly in the center of the core.

In another embodiment, the CMC/solid core articles of the present invention include a split line that is made according to another embodiment of the present invention. These CMC/solid core articles having a split line may be formed using the co-processing route, wherein, as previously discussed, a ceramic material is cast into a preformed CMC shell and sintered together to form a bond, with a split line being formed in the core.

While other processes may be used to form the article having a split line, such as CMC layup on a prefired refractory process and a secondary bonding process, the resulting article may not have as great a bond strength or may have a less refractory bond (i.e. the bond layer may have glassy phases), than those made with a co-processing method. Although, for certain applications, lower bond strength and/or a glassy phase may be acceptable due to the advantages offered by the internal stress relief that the split line in the solid core of the article.

In a co-processing method, the solid core may be made using a basic process wherein the CMC shell is laid up. Then, the CMC is bisque fired. The bisque firing is, again, a low temperature firing cycle (about 500° C.) used to stabilize the CMC matrix against water. Bisque firing does not reduce sintering activity of the matrix. Next, the refractory core is cast. The article is then dried. Next, the Friable Graded Insulation (FGI) may be cast. Then the article is dried and fired.

As the core having the split line is dried to the formation process, the split line offers one advantage in accelerating the drying process and/or permitting better control of the drying process. In several embodiments, the ceramic core is beneficially dried through the CMC so that the highly sinterable species (such as submicron alumina) may migrate to the bond line. The presence of the split line fugitive tool ensures that drying occurs through both the pressure and suction sides of the article, not just one side.

In addition to relieving strain in one dimension, the split lines used in the articles of the present invention also provide stress relaxation at intermediate temperatures, thereby increasing the life and/or usefulness of the article.

In an alternative embodiment, the split line in the article may be filled with a filler material. While the filler material may not have the same properties of the ceramic material making up the solid core, the filler material may still be used because the center of an article is generally a low temperature region and generally does not require high thermal conductivity. Additionally, pressure loads are generally minimal within the core filler region. For example, in an airfoil, the pressure may be less than about 0.5 MPa. As such, any filler material that is processable may be used. As used herein, "processable" indicates a filler material that is capable of substantially filling the gap caused by the split line and having a reduced porosity. It would be beneficial if the filler material also formed a good bond with the core material. Examples of filler materials that may be used in the present invention include, but are not limited to glass frit, calcium aluminosilicate, aluminum phosphate, sodium silicate, various other silicates, or combinations thereof.

One method for improving the processing compatibility of the core casting and the CMC is to include fugitive material in the core casting. This fugitive may be used with either embodiment of a continuous CMC shell or an open CMC shell. One exemplary embodiment of this concept is demonstrated by the current version of the ceria core material, which contains 20 vol % polystyrene spheres that are 0.5 to 1-mm in diameter. The styrene spheres burn out upon initial heat up, leaving controlled, well-dispersed porosity. The following lists one or more of the possible benefits of using a fugitive material in the core structure: it increases core sintering shrinkage (better match to the CMC), reduces core stiffness, and/or enables creep relaxation mechanism because there is enough open volume in structure such that creep deformation does not have to follow hydrostatic (constant volume) flow rules.

Figure 2:
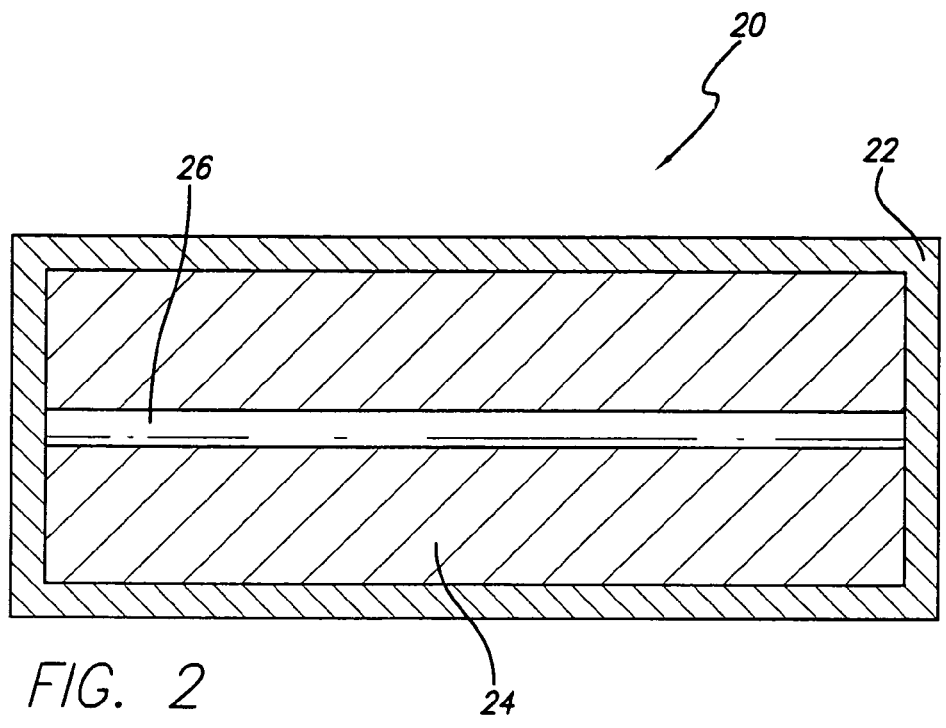
FIG. 2 shows a cross-sectional view of ceramic rectangle having a CMC shell and a solid core having a split line according to another embodiment of the present invention.
Figure 3:
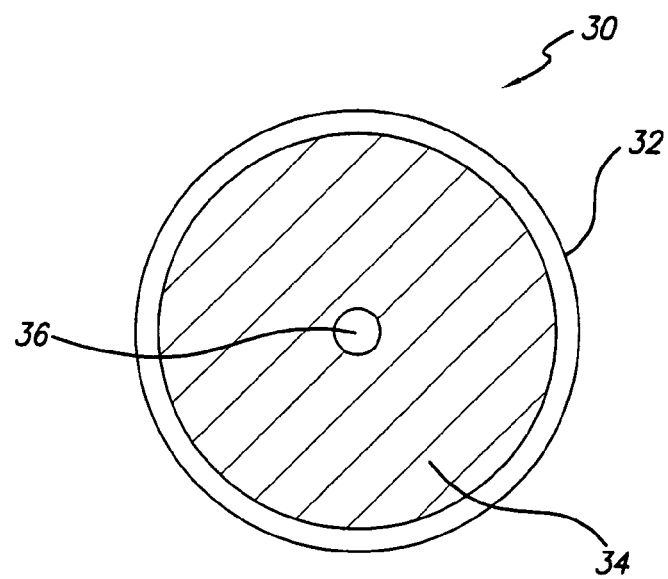
FIG. 3 shows a cross-sectional view of ceramic cylinder having a CMC shell and a solid core having a split line according to another embodiment of the present invention.

Reference is now made with specific detail to the drawings in which like reference numerals designate like or equivalent elements throughout the several views, and initially to FIGS. 1-3.

FIG. 1 provides a cross-sectional view of an airfoil according to one embodiment of the present invention. As shown in FIG. 1, airfoil 10 includes a continuous CMC shell 12. Inside the shell 12 is the solid core 14. The solid core 14 may be composed of any ceramic material, as previously discussed. A split line 16 is located within the solid core 14. The split line 16 may be formed in any manner as previously discussed. Also shown in FIG. 1 is a bond layer 18 between the shell 12 and solid core 14.

FIG. 2 provides a cross-sectional view of a ceramic cube or rectangle according to another embodiment of the present invention. As shown in FIG. 2, the rectangle or cube 20 includes a continuous CMC shell 22. Inside the shell 22 is the solid core 24. As with the airfoil, the solid core 24 may be composed of any ceramic material. A split line 26 is located within the solid core 24 and runs through the length of the solid core 24. The split line 26 may be formed in any manner as previously discussed.

FIG. 3 provides a cross-sectional view of a ceramic cylinder according to another embodiment of the present invention. As shown in FIG. 3, the cylinder 30 includes a continuous CMC shell 32. Inside the shell 32 is the solid core 34. As with the airfoil and the ceramic cube or rectangle, the solid core 34 may be composed of any ceramic material. A split line 36 is located within the solid core 34 and runs through the length of the solid core 34. The split line 36 may be formed using methods previously discussed in relation to airfoils and other ceramic article.

The present invention may be used to form CMC shell/solid core articles. In one embodiment, these articles are airfoils that may be used in a turbine engine. In other embodiments, the article may be selected from combustor tiles, airfoil platforms, ring segments or blade tip seals.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of forming a solid core ceramic airfoil, comprising:
    forming a ceramic matrix composite shell, wherein the ceramic matrix composite shell is a continuous shell;
    casting the solid core of the article using the ceramic matrix composite shell as a mold for the solid core, wherein a split line is formed in a middle region of the solid core such that the split line extends a length of the airfoil from a leading edge of the solid core into the middle region and terminates at a termination point closer to the trailing edge than the leading edge of the solid core, wherein the split line tapers in width linearly moving from the leading edge to the termination point near the trailing edge;
    drying the solid core; and
    firing the solid core.

2. The method of claim 1, further comprising the steps of:
casting a friable graded insulation on the ceramic matrix composite shell after drying of the solid core: and
drying the friable graded insulation before firing of the solid core.

3. The method of claim 1, wherein the ceramic matrix composite shell is an open shell.

4. The method of claim 1, further comprising the step of placing a filler material in a gap formed by the split line.

5. The method of claim 4, wherein the filler material is selected from glass frit, calcium aluminosilicate, sodium silicate, aluminum phosphate, a silicate, or combinations thereof.

6. The method of claim 1, further comprising the step of drying the core having the split line such that any highly sinterable species may migrate to a bond line in the ceramic article.

7. The method of claim 1, further comprising the step of applying a bond layer between the ceramic matrix composite shell and the solid core.

8. The method of claim 1, further comprising the step of bisque-firing the ceramic matrix composite shell after formation of the ceramic matrix composite shell to stabilize the ceramic matrix composite shell against water.

9. The method of claim 1, further comprising the step of adding a fugitive material to the solid core.

* * * * *